(12) United States Patent
Zhang et al.

(10) Patent No.: US 12,080,274 B2
(45) Date of Patent: Sep. 3, 2024

(54) CONCURRENT MULTI-PATH PROCESSING OF AUDIO SIGNALS FOR AUTOMATIC SPEECH RECOGNITION SYSTEMS

(71) Applicant: BEIJING DIDI INFINITY TECHNOLOGY AND DEVELOPMENT CO., LTD., Beijing (CN)

(72) Inventors: Yi Zhang, Mountain View, CA (US); Hui Song, Beijing (CN); Yongtao Sha, Beijing (CN); Chengyun Deng, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 276 days.

(21) Appl. No.: 17/433,868

(22) PCT Filed: Feb. 28, 2019

(86) PCT No.: PCT/CN2019/076395
§ 371 (c)(1),
(2) Date: Aug. 25, 2021

(87) PCT Pub. No.: WO2020/172831
PCT Pub. Date: Sep. 3, 2020

(65) Prior Publication Data
US 2022/0139368 A1     May 5, 2022

(51) Int. Cl.
*G10L 15/00* (2013.01)
*G10L 19/02* (2013.01)
(Continued)

(52) U.S. Cl.
CPC .............. *G10L 15/00* (2013.01); *G10L 19/02* (2013.01); *G10L 21/18* (2013.01); *G10L 25/18* (2013.01)

(58) Field of Classification Search
None
See application file for complete search history.

(56) References Cited

U.S. PATENT DOCUMENTS 9,668,066 B1 * 5/2017 Betts ................... H04R 25/40
9,741,360 B1 * 8/2017 Li ............................ G10L 25/51
(Continued)

FOREIGN PATENT DOCUMENTS

| CN | 1808571 A | 7/2006 |
|---|---|---|
| CN | 101996639 A | 3/2011 |

(Continued)

OTHER PUBLICATIONS

B. Gao, W. L. Woo and S. S. Dlay, "Unsupervised Single-Channel Separation of Nonstationary Signals Using Gammatone Filterbank and Itakura-Saito Nonnegative Matrix Two-Dimensional Factorizations," in IEEE Transactions on Circuits and Systems I: Regular Papers, doi: 10.1109/TCSI.2012.2215735 (Year: 2013).*

(Continued)

*Primary Examiner* — Richemond Dorvil
*Assistant Examiner* — Alexander G Marlow
(74) *Attorney, Agent, or Firm* — Sheppard Mullin Richter & Hampton LLP (57) ABSTRACT

A system and method for concurrent multi-path processing of audio signals for automatic speech recognition is presented. Audio information defining a set of audio signals may be obtained (502). The audio signals may convey mixed audio content produced by multiple audio sources. A set of source-specific audio signals may be determined by demixing the mixed audio content produced by the multiple audio sources. Determining the set of source-specific audio signals may comprises providing the set of audio signals to both a first signal processing path and a second signal processing path (504). The first signal processing path may determine a (Continued)

value of a demixing parameter for demixing the mixed audio content (506). The second signal processing path may apply the value of the demixing parameter to the individual audio signals of the set of audio signals (508) to generate the individual source-specific audio signals (510).

18 Claims, 7 Drawing Sheets

(51) Int. Cl.
*G10L 21/18* (2013.01)
*G10L 25/18* (2013.01)

(56) References Cited

U.S. PATENT DOCUMENTS

| | | | |
|---|---|---|---|
| 2007/0025564 | A1 | 2/2007 | Hiekata et al. |
| 2009/0043588 | A1* | 2/2009 | Takeda ................ G10L 21/0272 704/E21.001 |
| 2010/0174389 | A1* | 7/2010 | Blouet .................. G10L 21/028 706/52 |
| 2012/0045066 | A1 | 2/2012 | Nakadai et al. |
| 2018/0240470 | A1* | 8/2018 | Wang ................... G10L 19/008 |
| 2020/0027473 | A1* | 1/2020 | Wang ..................... G10L 15/20 |

FOREIGN PATENT DOCUMENTS

| | | | | |
|---|---|---|---|---|
| EP | 2237272 A2 | * | 10/2010 | ......... G10L 21/0272 |
| JP | 2005-236852 A | | 9/2005 | |
| WO | WO-2019016494 A1 | * | 1/2019 | ....... G06F 18/21342 |

OTHER PUBLICATIONS

Daneshkar Morteza and E. A. Reza, "A novel initialization approach for solving permutation ambiguity of frequency domain blind source separation," 2012 IEEE Symposium on Computers & Informatics (ISCI), Penang, Malaysia, 2012, pp. 189-192, doi: 10.1109/ISCI.2012.6222692. (Year: 2012).*

PCT International Search Report and the Written Opinion mailed Dec. 6, 2019, issued in related International Application No. PCT/CN2019/076395 (8 pages).

* cited by examiner

CONCURRENT MULTI-PATH PROCESSING OF AUDIO SIGNALS FOR AUTOMATIC SPEECH RECOGNITION SYSTEMS

CROSS REFERENCE TO RELATED APPLICATION

This application is a national stage application under 35 U.S.C. § 371 of PCT Application No. PCT/CN2019/076395, filed Feb. 28, 2019, entitled "Concurrent Multi-Path Processing of Audio Signals for Automatic Speech Recognition Systems." The entirety of the aforementioned application is incorporated herein by reference.

TECHNICAL FIELD

The disclosure relates generally to concurrent multi-path processing of audio signals for automatic speech recognition systems.

BACKGROUND

Speech assistant systems utilizing automatic speech recognition (ASR) are widely used in cars and other vehicles. Given voice commands, the systems may recognize the instruction and/or operate a function automatically, e.g., making phone calls, controlling AC, etc. Compared to manual operation, speech assistant systems keep drivers focusing on road condition, which greatly increases the driving safety.

SUMMARY

Automatic speech recognition (ASR) systems may yield good results in quiet environments, e.g., word error rate (WER) may drop down to 5% or less. However, their performance drops dramatically when the desired speech is corrupted by interferences, including competing talkers, background noise, and so on. There still remains a big challenge making ASR robust in real life applications where the environment may be noisy. ASR works well in lab/quiet conditions. But in real life driving conditions, ambient noise, air conditioning, traffic noise, and error rate increase significantly—can be below 60%—which may not be useful.

A pre-processing stage, to suppress interference and distort desired speech at minimum, is often considered an efficient technique to improve ASR robustness. Generally, better performance can be achieved when more microphones are used. But in practice small number of microphones (e.g., 2 or 3 microphones) may be preferred in automobile applications. One or more aspects of the present disclosure propose systems and methods implementing a real-time blind source separation technique to provide improved automatic speech recognition based on concurrent multi-path processing of audio signals. The proposed systems and methods may achieve improved recognition accuracy even with the existence of one or a combination of interference, real-time algorithm delay, or a relatively small number of microphones (e.g., 2 or 3).

One aspect of the present disclosure is directed to a method for concurrent multi-path processing of audio signals for automatic speech recognition. The method may comprise: obtaining audio information defining a set of audio signals, individual audio signals in the set of audio signals conveying mixed audio content produced by multiple audio sources, the mixed audio content including speech and noise; and determining a set of source-specific audio signals by demixing the mixed audio content produced by the multiple audio sources, individual source-specific audio signals representing individual audio content produced by specific individual audio sources of the multiple audio sources, wherein determining the set of source-specific audio signals comprises: providing the set of audio signals to a first signal processing path to determine a value of a demixing parameter for demixing the mixed audio content produced by the multiple audio sources; providing the set of audio signals to a second signal processing path to apply the value of the demixing parameter to the individual audio signals of the set of audio signals provided to the second signal processing path; and generating the individual source-specific audio signals from the individual audio signals based on the application of the value of the demixing parameter to the individual audio signals.

Another aspect of the present disclosure is directed to a system for concurrent multi-path processing of audio signals for automatic speech recognition. The system may comprise one or more processors, a memory storing instructions, and a speech recognition engine. The instructions, when executed by the one or more processors, may cause the system to perform: obtaining audio information defining a set of audio signals, individual audio signals in the set of audio signals conveying mixed audio content produced by multiple audio sources, the mixed audio content including speech and noise; and determining a set of source-specific audio signals by demixing the mixed audio content produced by the multiple audio sources, individual source-specific audio signals representing individual audio content produced by specific individual audio sources of the multiple audio sources, wherein determining the set of source-specific audio signals comprises: providing the set of audio signals to a first signal processing path to determine a value of a demixing parameter for demixing the mixed audio content produced by the multiple audio sources; providing the set of audio signals to a second signal processing path to apply the value of the demixing parameter to the individual audio signals of the set of audio signals provided to the second signal processing path; and generating the individual source-specific audio signals from the individual audio signals based on the application of the value of the demixing parameter to the individual audio signals, such that a first source-specific audio signal represents the speech and a second source-specific audio signal represents the noise.

In some embodiments, providing the set of audio signals to the first signal processing path further includes the operations of: transforming, based on a transformation rate, the individual audio signals to consecutive frames of a time-frequency domain representation of the individual audio signals; collecting the consecutive frames of the time-frequency domain representation of the individual audio signals into individual sets of combined consecutive frames of the time-frequency domain representations; and for the individual sets of combined consecutive frames of the time-frequency domain representations: approximating individual reduced dimensionality representations of the individual sets of combined consecutive frames of the time-frequency domain representation of the individual audio signals; decomposing the individual reduced dimensionality representations into individual sets of spectral bases and temporal activations; determining a current value of the demixing parameter based on the decomposed individual reduced dimensionality representations; comparing the current value of the demixing parameter to a previous value of the demixing parameter; and based on the comparison, setting the value of the demixing parameter as either the current value or a modified version of the current value.

In some embodiments, the operation of transforming the individual audio signals into consecutive frames of the time-frequency domain representation of the individual audio signals comprises an analysis filter bank (AFB) operation.

In some embodiments, the operation of approximating individual reduced dimensionality representations comprises a principal component analysis (PCA) whitening operation.

In some embodiments, providing the set of audio signals to the second signal processing path further includes the operations of: transforming, based on a transformation rate, the individual audio signals to consecutive frames of a time-frequency domain representation of the individual audio signals; and consecutively, for individual frames in the consecutive frames of the time-frequency domain representation of the individual audio signals: approximating an individual reduced dimensionality representation of the time-frequency domain representation of an individual audio signal included in an individual frame; and applying the value of the demixing parameter to the individual reduced dimensionality representation of the time-frequency domain representation of the individual audio signal included in the individual frame to obtain an individual demixed reduced dimensionality representation of the time-frequency domain representation of the individual audio signal included in the individual frame.

In some embodiments, the operation of transforming the individual audio signals to consecutive frames of the time-frequency domain representation of the individual audio signals comprises an analysis filter bank (AFB) operation.

In some embodiments, the operation of approximating the individual reduced dimensionality representation of the time-frequency domain representation of the individual audio signal included in the individual frame comprises a principal component analysis (PCA) whitening operation.

In some embodiments, generating the individual source-specific audio signals from the individual audio signals based on the application of the value of the demixing parameter to the individual audio signals comprises operations of: consecutively, for individual frames in the consecutive frames of the time-frequency domain representation of the individual audio signals: restoring the dimensionality of the individual demixed reduced dimensionality representation of the time-frequency domain representation of the individual audio signal included in the individual frame to obtain an individual demixed time-frequency domain representation of the individual audio signal included in the individual frame; and transforming the individual demixed time-frequency domain representation of the individual audio signal included in the individual frame to a time domain representation; and wherein the time domain representation of the consecutive frames of the individual demixed time-frequency domain representation of the individual audio signals comprises the individual source-specific audio signals.

In some embodiments, the operation of transforming the individual demixed time-frequency domain representation of the individual audio signal included in the individual frame to the time domain representation comprises a synthesis filter bank (SFB) operation.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve functioning of computing systems that process audio input for speech recognition systems/engines. One or more aspects of the present disclosure propose systems and/or methods implementing a real-time blind source separation technique to provide improved automatic speech recognition based on concurrent multi-path processing of audio signals. The proposed systems and method may achieve improved recognition accuracy even with the existence of one or a combination of interference, real-time algorithm delay, or a relatively small number of microphones (e.g., 2 or 3). In particular, one or more aspects of the present disclosure provide improvements for distinguishing human utterances (e.g., speech) from noise or other sounds.

Blind source separation (BSS) is a technique for separating specific sources from sound mixtures without any information about the environment and sources. Depending on number of sources and microphones, BSS algorithms can be categorized into determined and underdetermined BSS. In a determined situation, the number of microphones is larger than or equal to the number of sources, and independent component analysis (ICA) is a commonly used method; in an underdetermined situation, where the number of microphones is less than the number of sources, nonnegative matrix factorization (NMF) has received much attention. One or more aspects of the disclosure presented herein propose a real-time blind source separation system to improve the ASR engine performance. The proposed solutions achieve good recognition accuracy with the existence of interference, with real-time algorithm delay, and small number of microphones.

Figure 1:
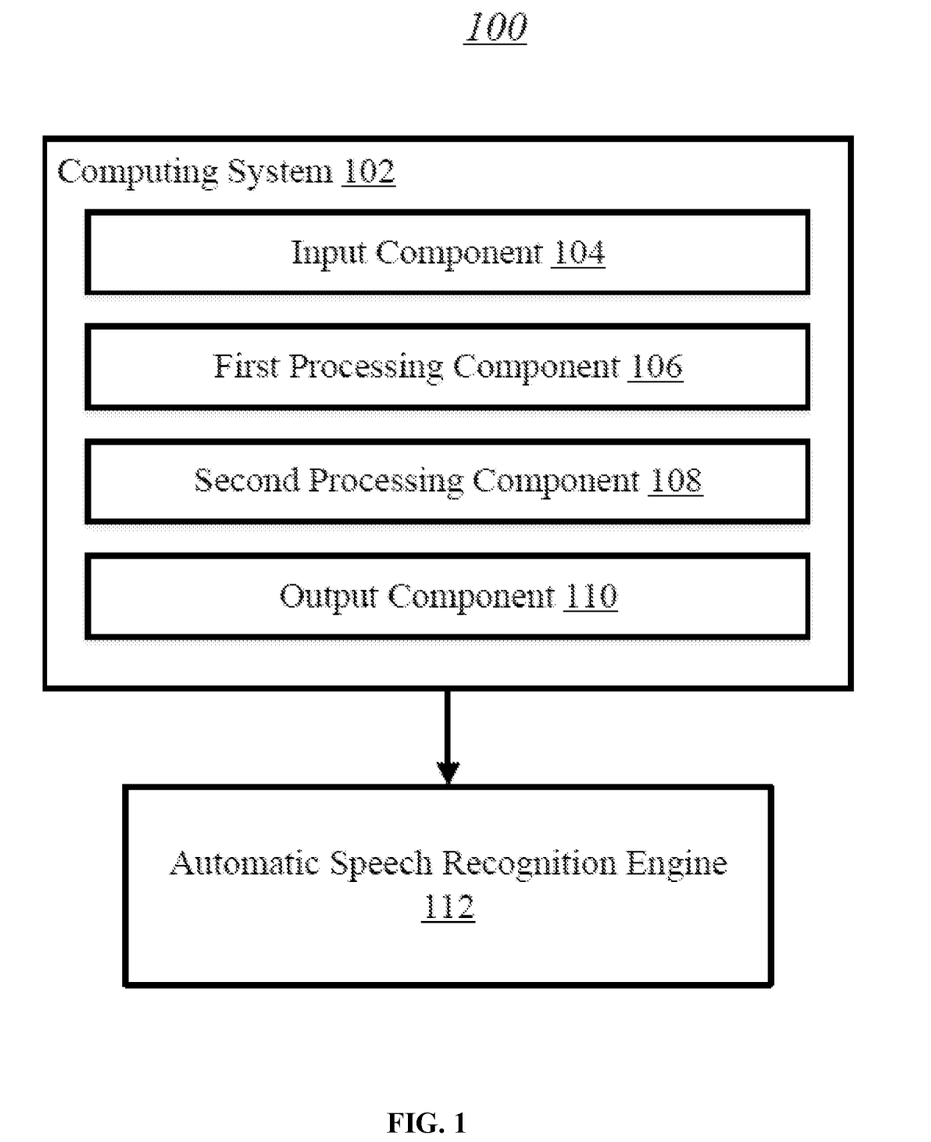
FIG. 1 illustrates an example environment for concurrent multi-path processing of audio signals for automatic speech recognition systems, in accordance with various embodiments of the disclosure.

FIG. 1 illustrates an example system 100 for concurrent multi-path processing of audio signals for automatic speech recognition, in accordance with various embodiments. The example system 100 may include a computing system 102 and an automatic speech recognition engine 112. The computing system 102 may include other components. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources or other entities participating in the system 100.

The computing system 102 may include an input component 104, a first processing component 106, a second processing component 108, and an output component 110. The computing system 102 may include other components. While the computing system 102 is shown in FIG. 1 as a single entity, this is merely for ease of reference and is not meant to be limiting. One or more components or one or more functionalities of the computing system 102 described herein may be implemented in a single computing device or multiple computing devices. In some embodiments, one or more components or one or more functionalities of the computing system 102 described herein may be implemented in one or more networks, one or more endpoints, one or more servers, or one or more clouds.

The input component 104 may obtain audio information defining a set of audio signals. A set of audio signals may include multiple audio signals. The individual audio signals may be received from individual audio input devices. For example, individual audio signals may be received from individual audio input devices in a set of audio input devices included in a vehicle. An audio input device may include, for example, a microphone. Individual audio signals in the set of audio signals may convey mixed audio content produced by multiple audio sources. The audio sources may include one or a combination of humans, an ambient environment, or other sources. The audio content may include one or a combination of human utterances (e.g., one or a combination of speech, words, sounds, or other utterances), background noise (e.g., one or a combination of car noises, environment noises, or other noise), or other audio content. The human utterances may include commands intended for the ASR engine 112. The mixed audio content obtained by individual audio input devices may refer to a combination of human utterances, background noise, and/or other sounds. The ASR engine 112 may be part of a device or other entity in which speech commands may be given. For example, the ASR engine 112 may control vehicle components based on commands uttered by a user within a vehicle. Accordingly, it may be desired to distinguish between individual human utterances and the background noise.

The output component 110 may determine a set of source-specific audio signals by demixing the mixed audio content produced by the multiple audio sources. Individual source-specific audio signals may represent individual audio content produced by specific individual audio sources of the multiple audio sources. For example, the demixing may result in distinguishing between utterances by different users and/or between human utterances and background noise. Determining the set of source-specific audio signals may be facilitated by processes and/or operations executed by one or both of the first processing component 106 and/or second processing component 108, described herein.

The first processing component 106 may be provided (e.g., via input component 104) with the set of audio signals to determine a value of a demixing parameter for demixing the mixed audio content produced by the multiple audio sources. The processes performed by the first processing component 106 may be referred to herein as the "first signal processing path." The value of the demixing parameter may be in the form of a demixing matrix which may be initially estimated using independent vector analysis (IVA) and/or other techniques (see, e.g., decomposition component 118).

The second processing component 108 may be provided (e.g., via input component 104) with the set of audio signals to apply the value of the demixing parameter to the individual audio signals of the set of audio signals. Demixing may result in distinguishing, within individual audio signals, human utterance from background noise. In some embodiments, the set of audio signals may be provided to the first processing component 106 and the second processing component 108 concurrently. The processes performed by the second processing component 108 may be referred to herein as the "second signal processing path."

Figure 2:
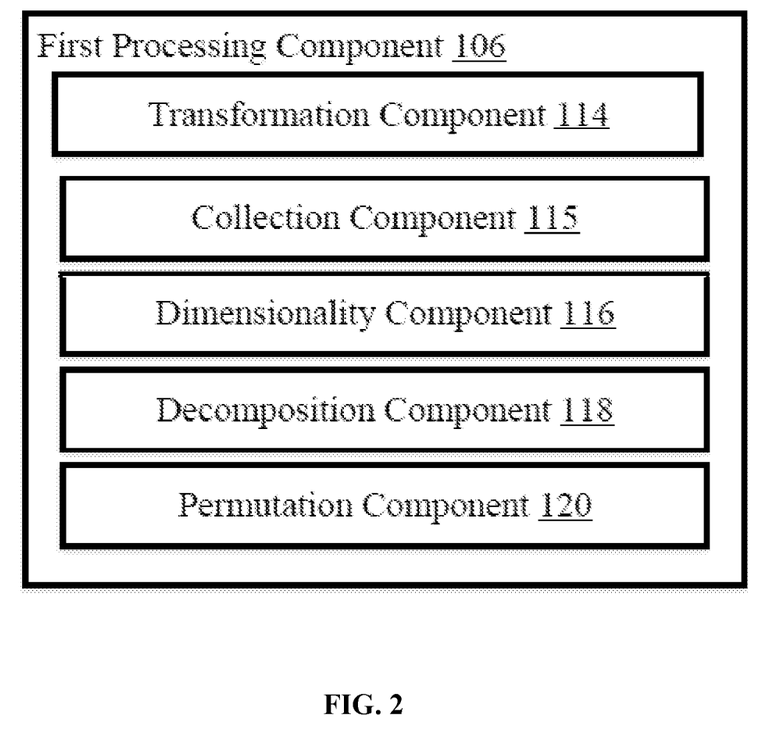
FIG. 2 an example environment for concurrent multi-path processing of audio signals for automatic speech recognition systems, in accordance with various embodiments of the disclosure.

FIG. 2 illustrates components utilized by first processing component 106 in order to achieve the determination of the value of the demixing parameter. The first processing component 106 may include of a transformation component 114, a collection component 115, a dimensionality component 116, a decomposition component 118, and a permutation component 120.

The transformation component 114 may be configured to transform, based on a transformation rate, the individual audio signals to consecutive frames of a time-frequency domain representation of the individual audio signals. In some implementations, the operation of transforming the individual audio signals into consecutive frames of the time-frequency domain representation of the individual audio signals comprises an analysis filter bank (AFB) operation and/or other operation. By way of non-limiting illustration, the individual audio signals in the set of audio signals may be passed through the analysis filter bank (AFB) to yield time-frequency (T-F) spectrum.

The collection component 115 may be configured to collect the consecutive frames of the time-frequency domain representation of the individual audio signals (e.g., spectrum frames) into individual sets of combined consecutive frames of the time-frequency domain representations. By way of non-limiting illustration, the collection component 115 may utilize one or more buffers to collect the consecutive frames of the time-frequency domain representation of the individual audio signals.

The operations of the dimensionality component 116 and the decomposition component 118 described herein may be performed for individual ones of the individual sets of combined consecutive frames of the time-frequency domain representations provided by the collection component 115. That is, once the consecutive frames of the time-frequency domain representation of the individual audio signals are collected into sets, the sets may be individually passed through dimensionality component 116 and the decomposition component 118.

The dimensionality component 116 may be configured to approximate individual reduced dimensionality representations of the individual sets of combined consecutive frames of the time-frequency domain representation of the individual audio signals. In some implementations, the operation of approximating individual reduced dimensionality representations may comprise a principal component analysis (PCA) whitening operation.

The source, observed, and separated signals in each time-frequency slot are described as $S_{k,t}$, $X_{k,t}$, and $Y_{k,t}$, respectively:

$S_{k,t} = (S_{k,t,1}, \ldots, S_{k,t,N})'$;
$X_{k,t} = (X_{k,t,1}, \ldots, X_{k,t,M})'$;
$Y_{k,t} = (Y_{k,t,1}, \ldots, Y_{k,t,N})'$;

where k and t are the frequency and frame indices, N and M are the number of sources and microphones. "'" is the vector transpose, and the entries of these vectors are complex values.

As an illustrative example, consider the mixing and demixing of source signals in a 2-source and 2-microphone scenario. Each source may propagate different acoustic paths and arrives at the microphones. "A" represents the mixing matrix.

$X_{k,t} = A_k S_{k,t}$

Multichannel microphone signals X are given to a blind source separation (BSS) block and a demixing matrix W is estimated, and separated signals Y are obtained correspondingly.

Principal component analysis (PCA) whitening may comprise a pre-processing step. The goal of whitening may be to make the input less redundant. Given data $X_m$ (e.g., the individual sets of combined consecutive frames of the time-frequency domain representation of the individual audio signals), the covariance matrix may be computed as:

$$\mathbb{C}_{k,m1,m2} = \frac{1}{R} \sum_{t=1}^{R} X_{k,t,m1} X'_{k,t,m2}, m1, m2 = 1, \ldots M;$$

where R is the number of frames. The principal direction of data variation, $u_1$, is the top eigenvector of $\mathbb{C}$, and similarly $u_2$ is the second eigenvector. Then the data may be rotated to maximize the independence as:

$$P = U'X = \begin{bmatrix} u'_1 X \\ u'_2 X \end{bmatrix}$$

The moving average (MA) may be applied to smooth the eigenvector, in order to remove the unnecessary disturbance on projection directions:

$\overline{U} = \alpha \overline{U} + (1-\alpha) U;$ where $\overline{U}$ and U are the smoothed and instantaneous eigenvectors.

The decomposition component 118 may be configured to decompose the individual reduced dimensionality representations into individual sets of spectral bases and temporal activations and determine a current value of the demixing parameter based on the decomposed individual reduced dimensionality representations. In some implementations, the operations of decomposing the individual reduced dimensionality representations into individual sets of spectral bases and temporal activations and determining the current value of the demixing parameter based on the decomposed individual reduced dimensionality representations may be facilitated by a multi-channel nonnegative matrix factorization.

Multi-channel nonnegative matrix factorization may utilize one or more of independent vector analysis (IVA), nonnegative matrix factorization (NMF), and/or other techniques.

Independent vector analysis (IVA) is a multivariate extension of independent component analysis (ICA) and can solve the permutation problem. The ICA based methods may only be applied to the determined situation. IVA assumes independence between the sources to estimate the demixing matrix, 'W'. In addition, IVA assumes a spherical multivariate distribution as the source model to ensure higher-order correlations between frequency bins in each source.

Nonnegative matrix factorization (NMF) is a type of sparse representation algorithm that decomposes a nonnegative matrix into two nonnegative matrices as $D_{I \times J} = T_{I \times B} V_{B \times J};$ where D is a nonnegative data matrix with dimension I×J, T and V are basis matrix and activation matrix with dimension I×B and B×J, respectively, I, J and B are number of frequency bins, number of frames, and number of bases when NMF is applied to an acoustic signal.

Demixing matrix, W, may be updated based on the following rules:

$$D_{k,m} = \frac{1}{R} \sum_{t=1}^{R} \frac{1}{r_{k,t,m}} X_{k,t} X_{k,t}^H;$$

$$W_{k,m} = (W_k D_{k,m})^{-1} e_m;$$

$$W_{k,m} = W_{k,m} \left( W_{k,m}^H D_{k,m} W_{k,m} \right)^{\frac{1}{2}}; \text{ and}$$

$$Q = WP.$$

NMF basis matrix T and activation matrix V, may be updated by following the Itakura-Saito divergence update rules:

$$T = T \sqrt{\frac{((TV)^{-2} |Q|^2) V'}{(TV)^{-1} V'}};$$

$$V = V \sqrt{\frac{T'((TV)^{-2} |Q|^2)}{T(Ty)^{-1}}}; \text{ and}$$

$$r_{k,t,m} = \sum_b T_{k,b,m} V_{b,t,m}.$$

The permutation component 120 may be configured to compare the current value of the demixing parameter to a previous value of the demixing parameter; and based on the comparison, set the value of the demixing parameter as either the current value or a modified value of the current value (e.g., an aligned demixing matrix, described below). The operations of permutation component 120 may be directed to solving a permutation problem. Permutation may refer to an unmixing of mixed audio signals into separate output channels (where an individual output channel includes either a speech or a noise audio signal) where an output channel previously determined to include the speech audio signal may subsequently be determined to be a noise signal. For example, for a given frame, it may be determined that a first output channel includes an unmixed audio signal comprising speech, and a second output channel includes an unmixed audio signal comprising noise. Permutation may occur when, for a subsequent frame, it may be determined that the first output channel includes an unmixed audio signal comprising noise, and the second output channel includes an unmixed audio signal comprising speech. Thus, the output channels may be considered permutated.

In previous solutions, it may be assumed that mixing and demixing matrix are time invariant, which often does not hold in practice. The permutation component 120 may track this change with a certain delay, that is, buffer frame size. Adjusting buffer frame size is a trade-off between stability and time sensitivity. Larger buffer frame size may guarantee better performance but less time sensitivity, and vice versa. Permutation may occur when buffer size is too small. For example, in a short period only one source is active, and demixing matrix which is updated on data from one source can be easily biased, or even worse, permutated.

Two approaches are proposed to solve the permutation issue. In a spatial approach, comparing the current value of the demixing parameter to a previous value of the demixing parameter may refer to calculating a distance between a current demixing matrix (W) and a previous demixing matrix. If different sources separate apart sufficiently, the distance matrix may be close to diagonal. If the distance matrix is far away from diagonal, there is high probability that only one source is active, and then permutation component 120 proceeds to a statistical approach for further examination.

For the statistic approach, the basis matrix in NMF represents the frequently appearing spectral patterns. The basis matrix can be utilized to separate speech from interferences, e.g., background noise, music, etc. By classifying the basis matrix, one can decide whether the active source is from desired speech or interference (e.g., noise, non-speech, etc.) and align the demixing matrix accordingly. Classifying the basis matrix may include determining whether the basis matrix is indicative of speech or noise. This may be accomplished by comparing a given basis matrix to a basis matrix known to be indicative of speech. For example, speech within the time-frequency domain may be more concentrated in low frequencies, display a harmonic structure, and/or have low energy. Noise within the time-frequency domain may be flat and/or have substantially even power in low and high frequencies. Aligning the demixing matrix may produce the modified value of the demixing parameter, e.g., the aligned demixing matrix. Aligning the basis matrix may correct permutation problem by changing output channels to conform to one standard. For example, as described above permutation may occur where output is mixed, and aligning the demixing matrix may reposition entries in the matrix to ensure the output channels are consistent (e.g., not permutated).

Figure 3:
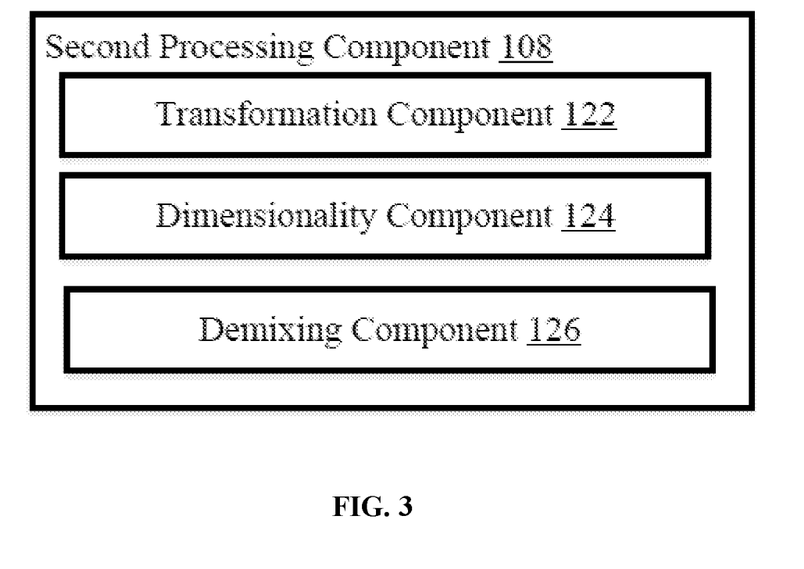
FIG. 3 an example environment for concurrent multi-path processing of audio signals for automatic speech recognition systems, in accordance with various embodiments of the disclosure.

FIG. 3 illustrates components utilized by second processing component 108 in order to achieve the application of the value of the demixing parameter to the individual audio signals of the set of audio signals provided to the second signal processing path. The second processing component 108 may include one or a combination of a transformation component 122, a dimensionality component 124, a demixing component 126, or other components.

The transformation component 122 may be configured to transform, based on a transformation rate, the individual audio signals to consecutive frames of a time-frequency domain representation of the individual audio signals. The operation of transforming the individual audio signals to consecutive frames of the time-frequency domain representation of the individual audio signals comprises an analysis filter bank (AFB) operation.

The operations of the dimensionality component 124 and the demixing component 126 described herein may be performed consecutively, for individual frames in the consecutive frames of the time-frequency domain representation of the individual audio signals. This process differs from the first signal processing path which collected the consecutive frames into combined sets, thus causing some delay in the processing to finish the collection.

The dimensionality component 124 may be configured to approximate, for the individual frames in the consecutive frames of the time-frequency domain representation of the individual audio signals, an individual reduced dimensionality representation of the time-frequency domain representation of the individual audio signals included in an individual frame. The operation of approximating the individual reduced dimensionality representation of the time-frequency domain representation of the individual audio signal included in the individual frame comprises a principal component analysis (PCA) whitening operation, described herein.

The demixing component 126 may be configured to apply, for the individual frames in the consecutive frames of the time-frequency domain representation of the individual audio signals, the value of the demixing parameter (obtained from the first processing component 106) to the individual reduced dimensionality representation of the time-frequency domain representation of the individual audio signals included in the individual frames. The application of the value of the demixing parameter may be accomplished through matrix multiplication. The application of the value of the demixing parameter may obtain, for the individual frames in the consecutive frames of the time-frequency domain representation of the individual audio signals, an individual demixed reduced dimensionality representation of the time-frequency domain representation of the individual audio signals included in the individual frames. The demixing component 126 may pass its output to the output component 110.

Figure 4:
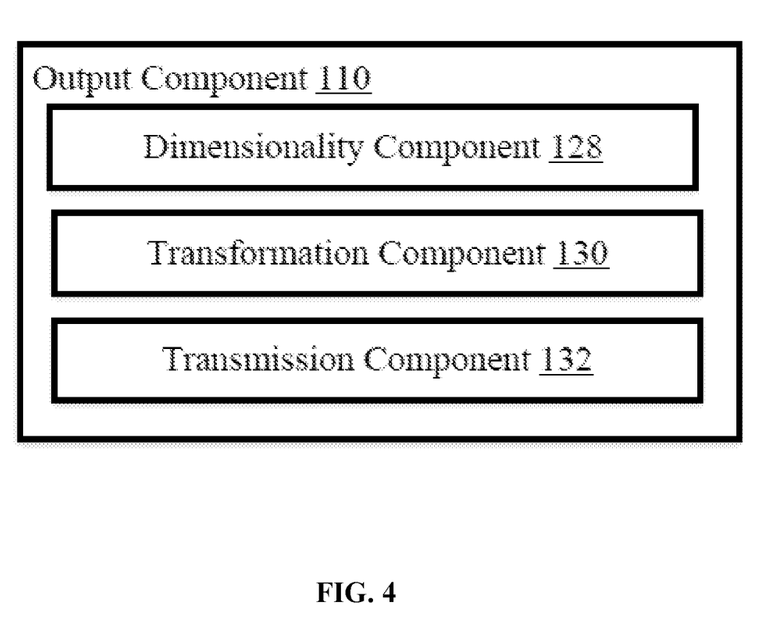
FIG. 4 an example environment for concurrent multi-path processing of audio signals for automatic speech recognition systems, in accordance with various embodiments of the disclosure.

FIG. 4 illustrates components utilized by output component 110 in order to achieve the generation of the individual source-specific audio signals from the individual audio signals based on the application of the value of the demixing parameter to the individual audio signals. The output component 110 may include one or a combination of a dimensionality component 128, a transformation component 130, a transmission component 132, or other components.

The operations of the dimensionality component 128 and the transformation component 130 described herein may be performed consecutively for individual frames in the consecutive frames of individual demixed reduced dimensionality representation of the time-frequency domain representation of the individual audio signals included in the individual frames.

The dimensionality component 128 may be configured to restore, for the individual frames, the dimensionality of the individual demixed reduced dimensionality representation of the time-frequency domain representation of the individual audio signal included in the individual frame. Restoring the dimensionality may obtain individual demixed time-frequency domain representation of the individual audio signals included in the individual frames. This processes of dimensionality component 128 may comprise a normalization that restores the signal scale back to the original power by applying a back-projection technique and/or other technique.

The transformation component 130 may be configured to transform the individual demixed time-frequency domain representation of the individual audio signals included in the individual frames to a time domain representation. The time domain representation of the consecutive frames of the individual demixed time-frequency domain representation of the individual audio signals may generate the individual source-specific audio signals. The operation of transforming to the time domain representation may comprise a synthesis filter bank (SFB) operation. By way of non-limiting illustration, the individual demixed time-frequency domain representation of the individual audio signals included in the individual frames may be passed through SFB to restore the signal to time domain and generate the individual source-specific audio signals (e.g., the signals have been demixed, restored to the original power, and transformed back into time domain).

The transmission component 132 may be configured to transmit the individual source-specific audio signals to the ASR engine 112. A source-specific audio signal may be transmitted directly or indirectly to the ASR engine 112 by the transmission component 132.

Figure 5:
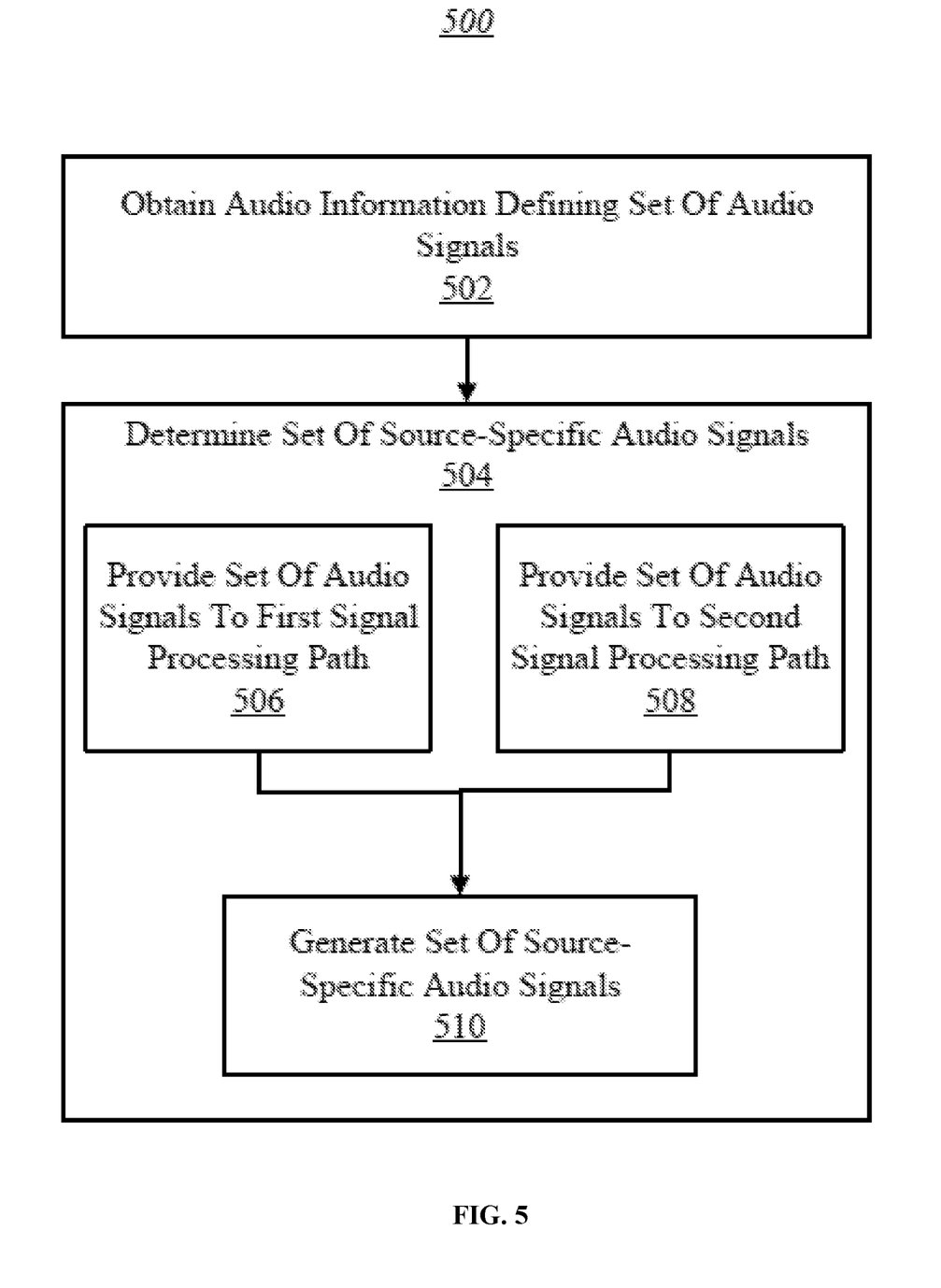
FIG. 5 illustrates an example flow chart of concurrent multi-path processing of audio signals for automatic speech recognition, in accordance with various embodiments of the disclosure.

FIG. 5 illustrates an example flow chart 200 for concurrent multi-path processing of audio signals for automatic speech recognition, in accordance with various embodiments of the disclosure. At block 502, audio information defining a set of audio signals may be obtained. The individual audio signals in the set of audio signals may convey mixed audio content produced by multiple audio source. At block 504, a set of source specific audio signals may be obtained by demixing the mixed audio content produced by the multiple audio sources. Individual source-specific audio signals may represent individual audio content produced by specific individual audio sources of the multiple audio sources. Blocks 506-510 illustrate the processes for determining the set of source-specific audio signals. At block 506, the set of audio signals to may be provided to a first signal processing path to determine a value of a demixing parameter for demixing the mixed audio content produced by the multiple audio sources. At block 508, the set of audio signals may be concurrently provided to a second signal processing path to apply the value of the demixing parameter to the individual audio signals of the set of audio signals provided to the second signal processing path. At block 510 the individual source-specific audio signals may be generated from the individual audio signals based on the application of the value of the demixing parameter to the individual audio signals.

Figure 6:
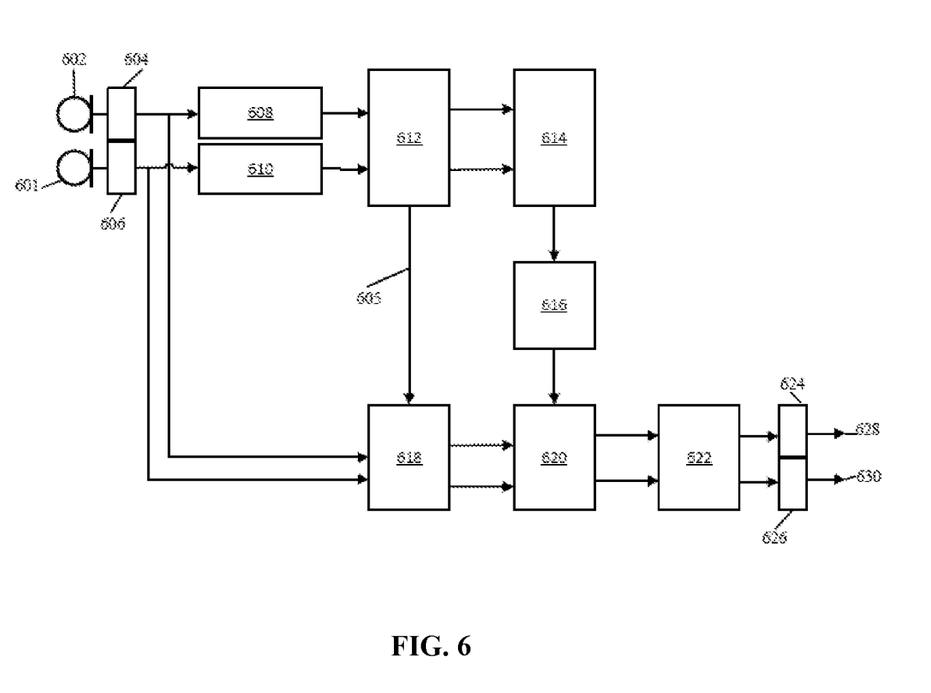
FIG. 6 illustrates an example flow chart of concurrent multi-path processing of audio signals for automatic speech recognition, in accordance with various embodiments of the disclosure.

FIG. 6 illustrates an example flow diagram of concurrent multi-path processing of audio signals for automatic speech recognition, in accordance with various embodiments of the disclosure. In particular, the FIG. 6 illustrates and distinguishes between the first signal processing path and the second signal processing path presented herein. Elements 601 and 602 represent two audio input devices (microphones). Element 601 generates an audio signal conveying mixed audio content produced by multiple audio sources. Element 602 generates an audio signal conveying mixed audio content produced by multiple audio sources. A goal of the signal processing is to determine source-specific audio signals representing audio content produced by individual ones of the sources. For illustrative purposes, we will assume the audio signals generated by elements 601 and 601 are representative of audio mixed by two sources. Thus, a goal of the processing may be to obtain a first source-specific audio signal 628 representative of audio content generated by one source, and a second source specific audio signal 630 representative of audio content generated by the other source.

The audio signals from elements 601 and 602 may be provided to analysis filter bank (AFB) 604 and AFB 606, respectively, to yield time-frequency (T-F) spectrum (e.g., consecutive frames of the time-frequency domain representation of the individual audio signals). The processing through elements 608-616 may represent the first signal processing path. The processing through elements 618-620 may represent the second signal processing path. The processing through elements 622-626 may represent processes carried out by output component 110 (shown in FIG. 1 and described herein).

Referring to the first signal processing path, elements 608 and 610 may represent individual buffers configured to collect the frequency domain representations after passing through elements 604 and 606, respectively. These buffers may represent the operation of collecting the consecutive frames of the time-frequency domain representation of the individual audio signals into individual sets of combined consecutive frames of the time-frequency domain representation.

Element 612 may represent a principal component analysis (PCA) whitening operation and/or other operation configured to approximate individual reduced dimensionality representations of the combined consecutive frames of the time-frequency domain representation of the individual audio signals.

Element 614 may perform tasks such as decomposing the individual reduced dimensionality representations into individual sets of spectral bases and temporal activations and determining a current value of the demixing parameter based on the decomposed individual reduced dimensionality representations. By way of non-limiting illustration, element 614 may represent a multi-channel nonnegative matrix factorization.

Element 616 may serve to solve the permutation problem. By way of non-limiting illustration, element 616 may perform one or more of comparing the current value of the demixing parameter to a previous value of the demixing parameter; and based on the comparison, setting the value of the demixing parameter as either the current value or a modified version of the current value.

Element 618 may obtain consecutive frames of the time-frequency domain representation of the individual audio signals after passing through AFBs 604 and 606. The element 618 may consecutively, for individual frames in the consecutive frames of the time-frequency domain representation of the individual audio signals, approximate an individual reduced dimensionality representation of the time-frequency domain representation of an individual audio signal included in an individual frame. Element 618 may represent a principal component analysis (PCA) whitening operation within the second signal processing path. Line 605 may represent the operations:

$$P = U'X = \begin{bmatrix} u'_1 X \\ u'_2 X \end{bmatrix}; \text{ and}$$

$$\bar{U} = \alpha \bar{U} + (1-\alpha)U,$$

described above.

Element 620 may consecutively, for individual frames in the consecutive frames of the time-frequency domain representation of the individual audio signals, apply the value of the demixing parameter (demixing matrix obtain from element 616) to the individual reduced dimensionality representation of the time-frequency domain representation of the individual audio signal included in the individual frame to obtain an individual demixed reduced dimensionality representation of the time-frequency domain representation of the individual audio signal included in the individual frame.

Element 622 may consecutively, for individual frames in the consecutive frames of the time-frequency domain representation of the individual audio signals obtain from element 620, restore the dimensionality of the individual demixed reduced dimensionality representation of the time-frequency domain representation of the individual audio signal included in the individual frame to obtain an individual demixed time-frequency domain representation of the individual audio signal included in the individual frame. By way of non-limiting illustration, element 622 may represent a back-projection technique and/or other technique to restore the signals to original dimensionality.

Elements 624 and 626 may consecutively, for individual frames in the consecutive frames of the time-frequency domain representation of the individual audio signals, transform the individual demixed time-frequency domain representation of the individual audio signal included in the individual frame to a time domain representation. The time domain representation of the consecutive frames of the individual demixed time-frequency domain representation of the individual audio signals may the first source-specific audio signal 628 and the second source-specific audio signal 630. By way of non-limiting illustration, elements 624 and 626 may represent synthesis filter bank operations. It is noted that although elements 604, 606, 624, and 626 are shown as separate elements within FIG. 6, this is for illustrative purposes only. In some implementations, element 604 (analysis filter bank) and element 624 (synthesis filter bank) may be integrated into a single component and element 606 (analysis filter bank) and element 626 (synthesis filter bank) may be integrated into a single component.

Experimentation has shown improvement over prior techniques with regard to delay and word error rate (WER) in speech processing when audio is obtained from both a back seat and a front seat of a vehicle. A higher WER represents worse performance. For example, with raw input (e.g., without signal separation) WER is highest. For a known prior technique of signal separation (See, e.g., D. Kitamura, et al. 'Determined blind source separation unifying independent vector analysis and nonnegative matrix factorization,' IEEE Trans. ASLP, vol. 24, no. 9, pp. 1626-1641, 2016) WER is improved by about half that of using raw input with respect to both front and back seat, and with delay of multiple seconds. With the solution proposed by the present disclosure, WER is improved by about two to six words in the back seat, and about one to two words for the front seat. Further, delay has been shown to be only in the thousandths of seconds. Both WER and delay are significantly improved.

Figure 7:
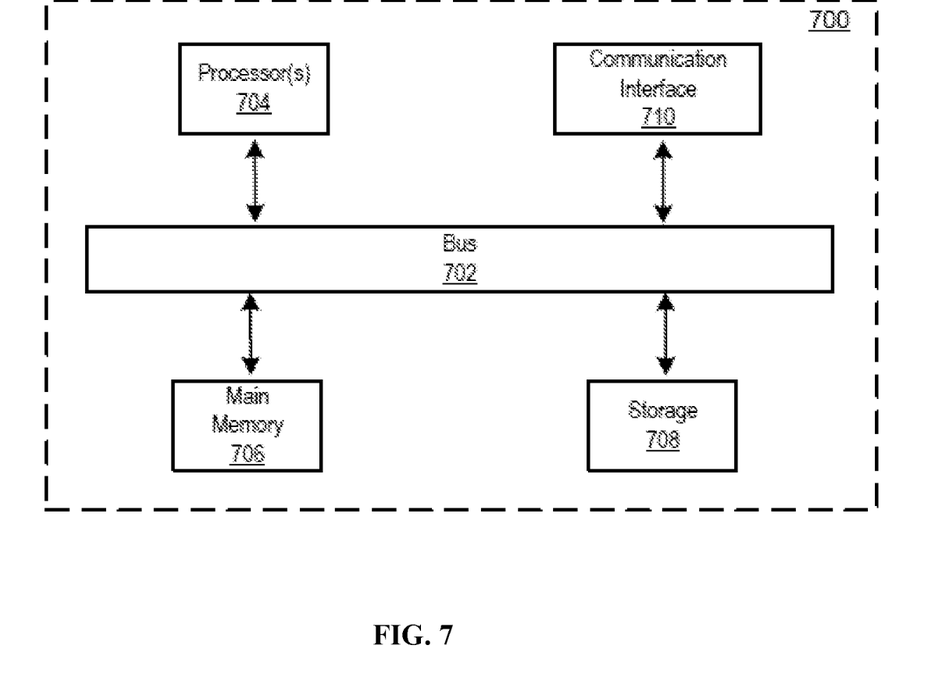
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RANI), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein. For example, the process/method shown in FIG. 5 and/or FIG. 6 and described in connection with these figures can be implemented by computer program instructions stored in main memory 706. When these instructions are executed by processor(s) 704, they may perform the steps as shown in FIG. 5 and/or FIG. 6 and described above. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for concurrent multi-path processing of audio signals for automatic speech recognition, the system comprising:
    one or more processors; and
    a memory storing instructions that, when executed by the one or more processors, cause the system to perform operations comprising:
    obtaining audio information defining a set of audio signals, individual audio signals in the set of audio signals conveying mixed audio content produced by multiple audio sources; and
    determining a set of source-specific audio signals by demixing the mixed audio content produced by the multiple audio sources, individual source-specific audio signals representing individual audio content produced by specific individual audio sources of the multiple audio sources, wherein determining the set of source-specific audio signals comprises:
        inputting time-frequency domain representations of the individual audio signals into one or more individual buffers to combine consecutive frames of the time-frequency domain representations into individual sets of consecutive frames of the time-frequency domain representations;
        determining, based on the individual sets of consecutive frames of the time-frequency domain representations, a value of a demixing parameter for demixing the mixed audio content produced by the multiple audio sources, wherein the determining the demixing parameter comprises:
            approximating individual reduced dimensionality representations of the individual sets of consecutive frames of the time-frequency domain representation of the individual audio signals;
            decomposing the individual reduced dimensionality representations;
            determining a current value of the demixing parameter based on the decomposed individual reduced dimensionality representations;
            comparing the current value of the demixing parameter to a previous value of the demixing parameter; and
            based on the comparison, setting the value of the demixing parameter as either the current value or a modified version of the current value;
        concurrently providing the time-frequency domain representations of the individual audio signals to a second signal processing path to apply the value of the demixing parameter to the individual audio signals of the set of audio signals provided to the second signal processing path; and
        generating the individual source-specific audio signals from the individual audio signals based on the application of the value of the demixing parameter to the individual audio signals.

2. The system of claim 1, wherein the operation of transforming the individual audio signals into consecutive frames of the time-frequency domain representation of the individual audio signals comprises an analysis filter bank (AFB) operation.

3. The system of claim 1, wherein the operation of approximating individual reduced dimensionality representations comprises a principal component analysis (PCA) whitening operation.

4. The system of claim 1, wherein the operation of decomposing the individual reduced dimensionality representations comprises decomposing the individual reduced dimensionality representations into individual sets of spectral bases and temporal activations using a multi-channel nonnegative matrix factorization.

5. The system of claim 1, wherein providing the time-frequency domain representations of the individual audio signals to the second signal processing path further comprises:
    consecutively, for individual frames in the consecutive frames of the time-frequency domain representation of the individual audio signals:
    approximating an individual reduced dimensionality representation of the time-frequency domain representation of an individual audio signal included in an individual frame; and
    applying the value of the demixing parameter to the individual reduced dimensionality representation of the time-frequency domain representation of the individual audio signal included in the individual frame to obtain an individual demixed reduced dimensionality representation of the time-frequency domain representation of the individual audio signal included in the individual frame.

6. The system of claim 5, wherein the operations further comprise an analysis filter bank (AFB) operation to transform the individual audio signals to consecutive frames of the time-frequency domain representation of the individual audio signals.

7. The system of claim 5, wherein the operation of approximating the individual reduced dimensionality representation of the time-frequency domain representation of the individual audio signal included in the individual frame comprises a principal component analysis (PCA) whitening operation.

8. The system of claim 5, wherein generating the individual source-specific audio signals from the individual audio signals based on the application of the value of the demixing parameter to the individual audio signals comprises operations of:
consecutively, for individual frames in the consecutive frames of the time-frequency domain representation of the individual audio signals:
restoring the dimensionality of the individual demixed reduced dimensionality representation of the time-frequency domain representation of the individual audio signal included in the individual frame to obtain an individual demixed time-frequency domain representation of the individual audio signal included in the individual frame; and
transforming the individual demixed time-frequency domain representation of the individual audio signal included in the individual frame to a time domain representation; and
wherein the time domain representation of the consecutive frames of the individual demixed time-frequency domain representation of the individual audio signals comprises the individual source-specific audio signals.

9. The system of claim 8, wherein the operation of transforming the individual demixed time-frequency domain representation of the individual audio signal included in the individual frame to the time domain representation comprises a synthesis filter bank (SFB) operation.

10. A method for concurrent multi-path processing of audio signals for automatic speech recognition, the method comprising:
obtaining audio information defining a set of audio signals, individual audio signals in the set of audio signals conveying mixed audio content produced by multiple audio sources; and
determining a set of source-specific audio signals by demixing the mixed audio content produced by the multiple audio sources, individual source-specific audio signals representing individual audio content produced by specific individual audio sources of the multiple audio sources, wherein determining the set of source-specific audio signals comprises:
inputting time-frequency domain representations of the individual audio signals into one or more individual buffers to combine consecutive frames of the time-frequency domain representations into individual sets of consecutive frames of the time-frequency domain representations;
determining, based on the individual sets of consecutive frames of the time-frequency domain representations, a value of a demixing parameter for demixing the mixed audio content produced by the multiple audio sources, wherein the determining the demixing parameter comprises:
approximating individual reduced dimensionality representations of the individual sets of consecutive frames of the time-frequency domain representation of the individual audio signals;
decomposing the individual reduced dimensionality representations;
determining a current value of the demixing parameter based on the decomposed individual reduced dimensionality representations;
comparing the current value of the demixing parameter to a previous value of the demixing parameter; and
based on the comparison, setting the value of the demixing parameter as either the current value or a modified version of the current value;
concurrently providing the time-frequency domain representations of the individual audio signals to a second signal processing path to apply the value of the demixing parameter to the individual audio signals of the set of audio signals provided to the second signal processing path; and
generating the individual source-specific audio signals from the individual audio signals based on the application of the value of the demixing parameter to the individual audio signals.

11. The method of claim 10, wherein the operation of transforming the individual audio signals into consecutive frames of the time-frequency domain representation of the individual audio signals comprises an analysis filter bank (AFB) operation.

12. The method of claim 10, wherein the operation of approximating individual reduced dimensionality representations comprises a principal component analysis (PCA) whitening operation.

13. The method of claim 10, wherein the operation of decomposing the individual reduced dimensionality representations comprises decomposing the individual reduced dimensionality representations into individual sets of spectral bases and temporal activations using a multi-channel nonnegative matrix factorization.

14. The method of claim 10, wherein the second signal processing path includes operations of:
consecutively, for individual frames in the consecutive frames of the time-frequency domain representation of the individual audio signals:
approximating an individual reduced dimensionality representation of the time-frequency domain representation of an individual audio signal included in an individual frame; and
applying the value of the demixing parameter to the individual reduced dimensionality representation of the time-frequency domain representation of the individual audio signal included in the individual frame to obtain an individual demixed reduced dimensionality representation of the time-frequency domain representation of the individual audio signal included in the individual frame.

15. The method of claim 14, further comprising: an analysis filter bank (AFB) operation to transform the individual audio signals to consecutive frames of the time-frequency domain representation of the individual audio signals.

16. The method of claim 14, wherein the operation of approximating the individual reduced dimensionality representation of the time-frequency domain representation of the individual audio signal included in the individual frame comprises a principal component analysis (PCA) whitening operation.

17. The method of claim 14, wherein generating the individual source-specific audio signals from the individual audio signals based on the application of the value of the demixing parameter to the individual audio signals comprises operations of:

consecutively, for individual frames in the consecutive frames of the time-frequency domain representation of the individual audio signals:

restoring the dimensionality of the individual demixed reduced dimensionality representation of the time-frequency domain representation of the individual audio signal included in the individual frame to obtain an individual demixed time-frequency domain representation of the individual audio signal included in the individual frame; and transforming the individual demixed time-frequency domain representation of the individual audio signal included in the individual frame to a time domain representation; and wherein the time domain representation of the consecutive frames of the individual demixed time-frequency domain representation of the individual audio signals comprises the individual source-specific audio signals.

18. The method of claim 17, wherein the operation of transforming the individual demixed time-frequency domain representation of the individual audio signal included in the individual frame to the time domain representation comprises a synthesis filter bank (SFB) operation.

* * * * *